(12) United States Patent
Mayer et al.

(10) Patent No.: US 10,798,323 B1
(45) Date of Patent: Oct. 6, 2020

(54) CONTROL METHOD FOR AN ACTIVE PIXEL IMAGE SENSOR

(71) Applicant: Teledyne e2v Semiconductors SAS, Saint Egrève (FR)

(72) Inventors: Frédéric Mayer, Voiron (FR); Frédéric Barbier, Fontanil-Cornillon (FR); Stéphane Gesset, Saint Laurent du Pont (FR)

(73) Assignee: TELEDYNE E2V SEMICONDUCTORS SAS, Saint Egrève (FR)

( * ) Notice: Subject to any disclaimer, the term of this patent is extended or adjusted under 35 U.S.C. 154(b) by 333 days.

(21) Appl. No.: 16/070,885

(22) PCT Filed: Jan. 13, 2017

(86) PCT No.: PCT/EP2017/050633
§ 371 (c)(1),
(2) Date: Jul. 18, 2018

(87) PCT Pub. No.: WO2017/125316
PCT Pub. Date: Jul. 27, 2017

(30) Foreign Application Priority Data

Jan. 19, 2016 (FR) ..................................... 16 50415

(51) Int. Cl.
*H04N 5/355* (2011.01)
*H04N 5/374* (2011.01)
(Continued)

(52) U.S. Cl.
CPC ..... *H04N 5/35554* (2013.01); *H04N 5/35527* (2013.01); *H04N 5/35581* (2013.01); *H04N 5/37452* (2013.01)

(58) Field of Classification Search
CPC ............... H04N 5/355; H04N 5/35554; H04N 5/35581; H04N 5/35572; H04N 5/35527;
(Continued)

(56) References Cited

U.S. PATENT DOCUMENTS 8,717,452 B2 * 5/2014 Yamashita ......... H04N 5/37452
348/222.1
9,674,468 B2 * 6/2017 Kobayashi ........... H04N 5/3591
250/208.1
(Continued)

FOREIGN PATENT DOCUMENTS

FR 2961631 A1 12/2011
JP 20063115150 A 11/2006

OTHER PUBLICATIONS

International Search Report and Written Opinion for PCT/EP2017/050633, dated Apr. 7, 2017.

*Primary Examiner* — Marly S Camargo
(74) *Attorney, Agent, or Firm* — Pilloff Passino & Cosenza LLP; Sean A. Passino; Rachel K. Pilloff

(57) ABSTRACT

In an active pixel sensor comprising a photodiode Dp, a memory node MN and a readout node SN, the memory node being provided to contain the charge generated by the photodiode at the end of an integration period allowing an integration in global shutter mode and a correlated double sampling, it is envisaged to carry out, in each integration period, at least one transfer ② of charge from the photodiode to the memory node followed by clipping ③ of the amount of charge contained in the memory node at an intermediate voltage $t_1$ after the start of the integration period but before a last transfer of charge ④ to the memory node at the end of the integration period. The pixels are subsequently read out, row by row, by correlated double sampling CDS. The one or more intermediate transfers, with clipping, to the memory node during the integration period
(Continued)

allow the dynamic range of the sensor to be extended to high levels of ambient light while retaining good sensitivity to low levels of ambient light.

19 Claims, 5 Drawing Sheets

(51) Int. Cl.
*H04N 5/378* (2011.01)
*H04N 5/235* (2006.01)
*H04N 5/359* (2011.01)
*H04N 5/217* (2011.01)
*H01L 27/146* (2006.01)
*H04N 5/3745* (2011.01)

(58) Field of Classification Search
CPC .. H04N 5/3745; H04N 5/37452; H04N 5/378; H04N 5/32236; H04N 5/359; H04N 5/3591; H04N 5/3592; H04N 5/2329; H04N 5/2353; H04N 5/2532; H04N 5/2355; H04N 5/2175; H01L 27/14612

USPC ............ 348/308, 300, 302, 294, 297, 231.3; 250/208.1; 257/291, 292, 443, 27, 69, 257/192; 341/136

See application file for complete search history.

(56) References Cited

U.S. PATENT DOCUMENTS

| | | | |
|---|---|---|---|
| 10,263,032 B2* | 4/2019 | Wan | H01L 27/14643 250/204.1 |
| 2004/0018078 A1* | 1/2004 | Lee | H01L 27/14643 257/292 |
| 2006/0219868 A1* | 10/2006 | Morimoto | H01L 27/14609 250/208.1 |
| 2009/0101796 A1 | 4/2009 | Ladd et al. | |
| 2011/0019045 A1* | 1/2011 | Lin | H04N 5/353 348/296 |
| 2014/0015012 A1 | 1/2014 | Oike | |
| 2018/0367748 A1* | 12/2018 | Mayer | H04N 5/37452 250/208.1 |

\* cited by examiner

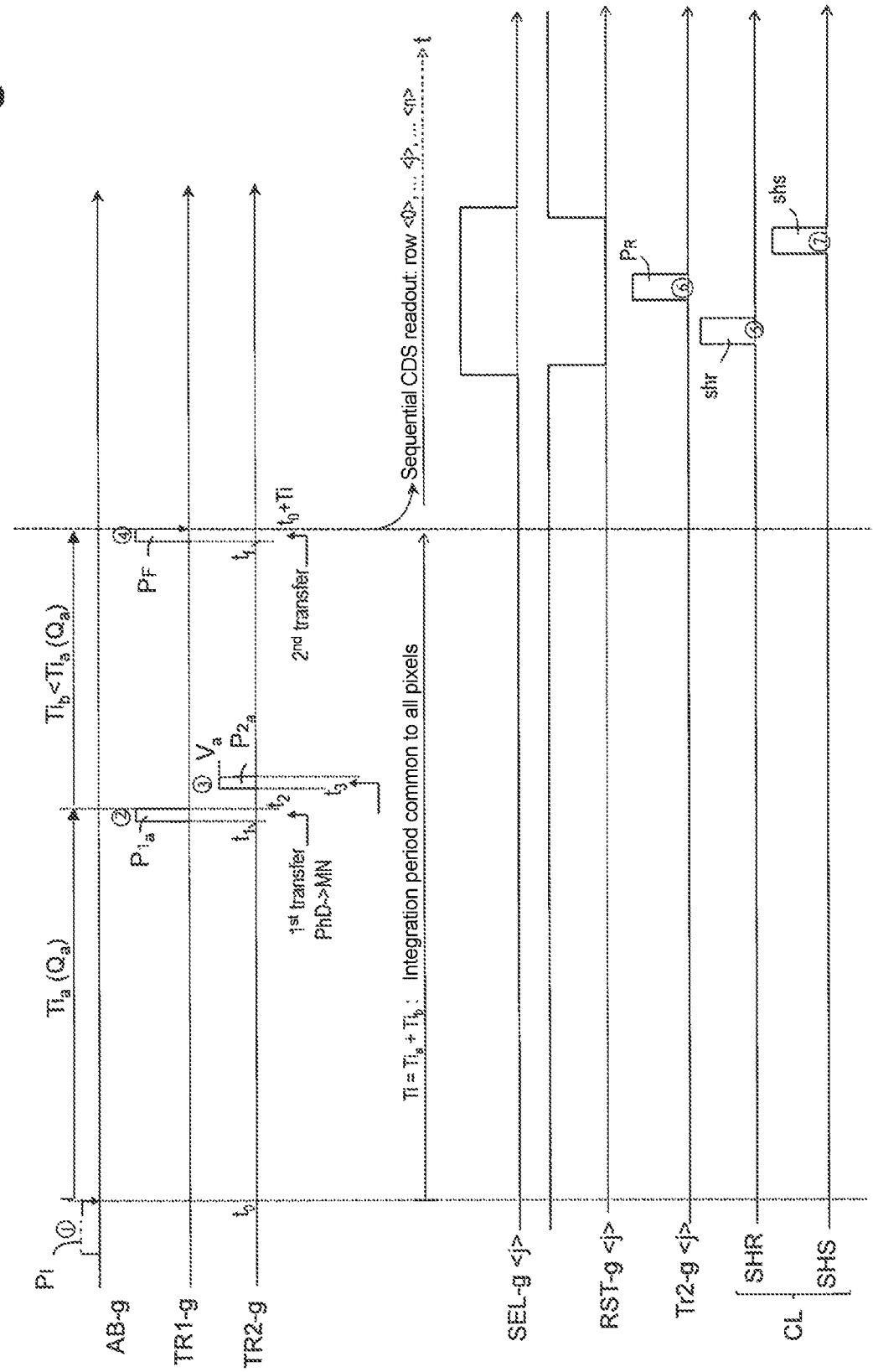

INTEGRATION
Fig. 3a phase ① Fig. 3b
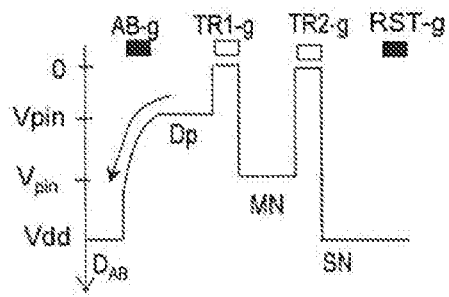 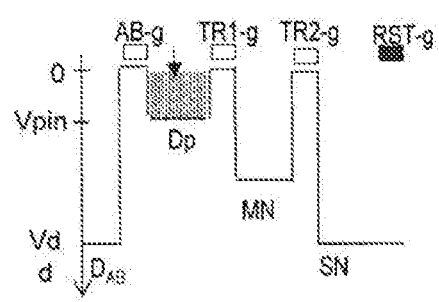
Fig. 3c phase ② Fig. 3d
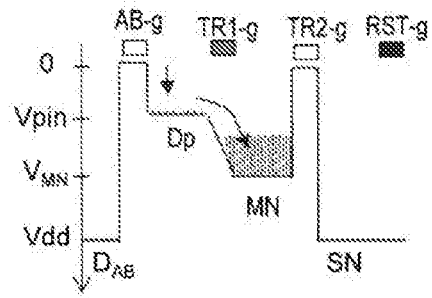 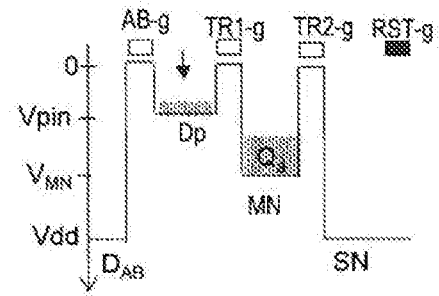
Fig. 3e phase ③ Fig. 3f
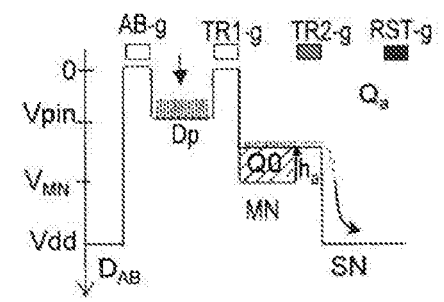 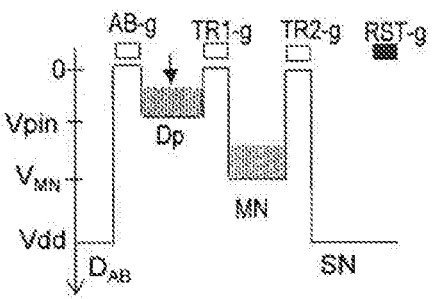
Fig. 3g phase ④ Fig. 3h
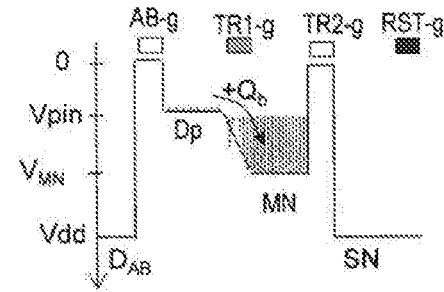 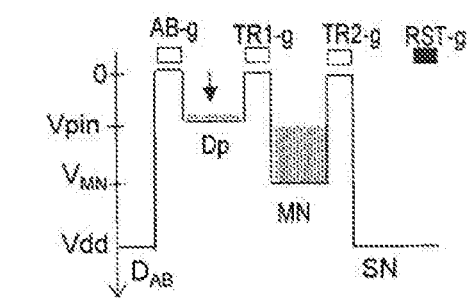

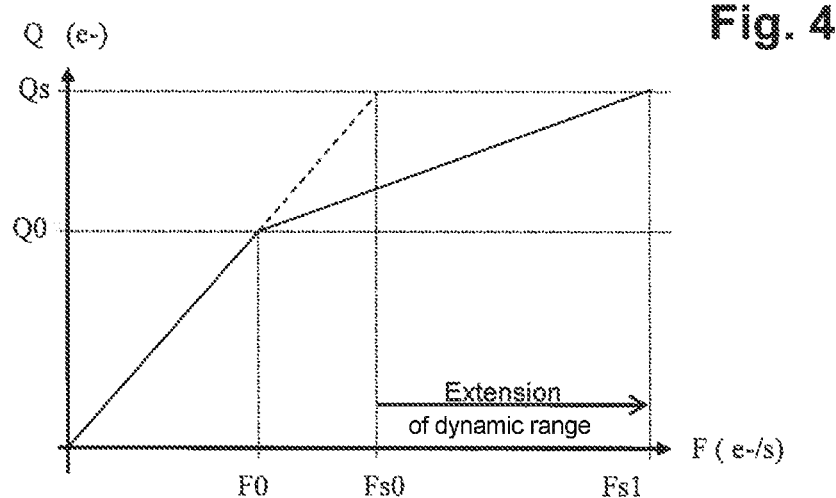
Fig. 4
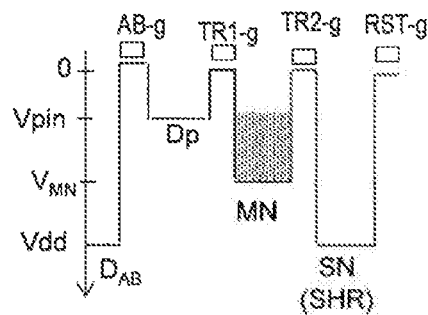
Fig. 5a  phase 5
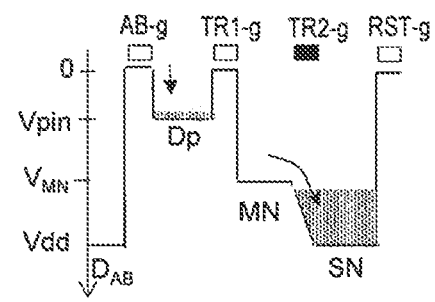
Fig. 5b  phase 6
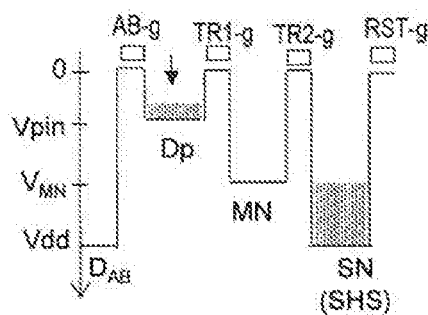
Fig. 5c  phase 7

CONTROL METHOD FOR AN ACTIVE PIXEL IMAGE SENSOR

TECHNICAL FIELD

The invention relates to electronic image sensors operating on the basis of active pixels using MOS technology. More precisely, the invention relates to a method for controlling the various transistors which make up the active pixel.

PRIOR ART

Active pixels most often comprise a photodiode that converts received photons to electric charge, and multiple MOS transistors allowing the readout of this charge and its conversion to electrical voltage to be controlled. In a matrix-array sensor, the rows of pixels are addressed individually and the voltages output by the pixels are applied to column conductors common to the pixels of a given column. Readout circuits at the foot of the column allow the voltages present on the columns to be sampled for each addressed row of pixels. The samples are stored in capacitors of the readout circuit. The samples are then converted to digital form by an analogue-to-digital converter (for example one converter for each column of pixels).

Active pixels using a photodiode generally comprise at least four transistors: a transfer transistor that serves to transfer the charge from the photodiode to what is referred to as a readout node, which is a capacitive charge storage node; a readout transistor, which is connected in a voltage follower configuration and the gate of which is connected to the readout node in order to bring its source to a voltage representing the voltage of this node; a row-selection transistor controlled by a row conductor for selecting an entire row of pixels, this selection transistor allowing the output of the follower transistor of the pixel to be connected to the corresponding column conductor and thereby to the readout circuit at the foot of the column; and a reset transistor allowing the potential of the readout node to be reset to a reference value.

These active pixel structures allow images to be captured using what is referred to as the global shutter technique: all of the pixels integrate charge generated by light during an integration period common to all of the pixels. The pixels are then read out sequentially, row by row. This capture technique is advantageous in comparison with the integration technique referred to as the rolling shutter technique, in particular because it makes it possible to avoid distortion effects when images of moving objects are captured.

The pixel control sequence in the common integration phase is the following:
for the time of an initialization control pulse, charge is forced out of all of the photodiodes. The end of the pulse sets the start of the integration period of the photodiodes: they may once more accumulate the charge generated under the effect of the light to which they are exposed. This may be achieved by simultaneously turning on, for the time of the initialization pulse, the transfer transistor and reset transistor of the readout node, the charge then being removed via the drain of the reset transistor. However, it is generally preferred to use a specific fifth transistor to reset the photodiodes, the source of which is connected to the photodiode of the pixel, the charge being removed via the drain of this transistor.

all of the transfer transistors are turned on simultaneously for the time of a control pulse applied to their gates: the charge accumulated by each photodiode from the start of the current integration period is transferred to the associated readout node. The end of this transfer control pulse sets the end of the integration period for all of the pixels.

After each integration period, the phase of reading out the pixels may start. The pixels are read out sequentially, row by row. For each of the pixels of a row, the selection transistor of the pixel is turned on for the time of a selection control pulse, and during this time:
the signal level applied to the column conductor is sampled in the readout circuit at the foot of the column of the pixel; then
the initialization transistor of the readout node is turned on for the time of a reset control pulse and the reference level applied to the column conductor is sampled in the readout circuit.

The readout circuit delivers as output, for each pixel, a measurement of the difference between the signal level and the reference level of the pixel. However, this level is not a precise measurement of the amount of charge generated in the photodiode because the random noise, referred to as kTC noise, is not removed. Indeed, this noise is generated by the reset of the readout node by the reset transistor and means that the potential applied to the readout node is not absolutely certain. In order to be able to remove this uncertainty, making it possible to precisely measure the amount of charge generated in the photodiode of the pixel for the integration period in question, it is necessary first to be able to initialize the readout node in order to sample the reference potential level, and only after having established the (transfer) signal level in order to sample it. This is referred to as correlated double sampling (CDS) readout. With the four- or five-transistor structure such as described, CDS readout is not known to be possible when a common integration sequence is performed on all of the pixels at the same time.

Thus, in the prior art, structures comprising a memory node between the photodiode and the readout node have been proposed. The memory node makes it possible to store the charge generated by the photodiode after each of the integration periods common to all the pixels, for the time it takes, in each row of pixels, to initialize the readout node of each of the pixels, and to sample the corresponding reference level in the readout circuit of each of the pixels of the row, then to transfer the charge from the memory node to the readout node and to sample the signal level in the readout circuit. The corresponding active pixel structure then comprises two transfer transistors (or gates), a first between the photodiode and the memory node and a second between the memory node and the readout node. The first transfer transistor between the photodiode and the memory node is then the transistor that controls the end of each integration period for all of the pixels at the same time, this end coinciding with the end of the transfer control pulse in the memory node. The second transfer transistor is employed in the sequential pixel row readout phase.

These active pixel structures which have been proposed, for example, in the publications FR2961631 and JP20063115150 to allow both an image to be captured by all the pixels simultaneously in the same integration period and a CDS readout of the pixels, row by row, thus provide a dynamic range that is optimized at the low end, since they are low readout noise structures (CDS readout).

However, an improvement in the high-end dynamic range of the pixels for high levels of ambient light without increasing the size of the pixels, which is mainly determined by the area occupied by the photodiode, is also sought.

One proposed solution consists of successively capturing multiple images with different integration times and, for each pixel, determining the best adapted signal from among the signals obtained. However, this increases the overall acquisition and processing time. Another solution consists of determining the time taken for a pixel to be saturated in order to deduce information on the light level therefrom in the case of saturating illumination. This assumes the presence of pixels of more complex structure and associated processing. Another solution uses the initialization transistor of the photodiodes during the integration period in order to allow excess charge to be removed from the photodiode by biasing the gate of this transistor to a set voltage below the threshold voltage of the transistor, in order to adjust the potential of the barrier of the semiconductor region under the gate. The response of the pixel then becomes logarithmic beyond a certain luminosity threshold. However, this solution is sensitive to technological dispersions (threshold voltages of the transistors, open circuit potential of the photodiodes).

SUMMARY

The invention proposes another method which allows the dynamic range of the sensor to be extended without modifying the structure or the size of the pixels. More specifically, it is envisaged to carry out, in the integration period common to the pixels, at least one transfer of charge from the photodiode to the memory node via the first transfer transistor, with an operation of clipping the amount of charge contained in the memory node in comparison with a threshold set by the second transfer transistor, allowing a change in the slope of the response curve beyond an intensity of luminous flux corresponding to this charge clipping threshold.

The invention relates to a method for controlling an active pixel in an image sensor, the active pixel structure comprising a photosensitive element, a readout node and a memory node between the photosensitive element and the readout node, a first charge transfer transistor between the photosensitive element and the memory node and a second charge transfer transistor between the memory node and the readout node, a follower transistor, the gate of which is connected to the readout node, and at least one initialization transistor of the readout node.

In each new integration period, the control method comprises the following steps, applied to all of the pixels simultaneously:
- applying, to the gate of all of the first transfer transistors:
  - at least one first voltage pulse at an intermediate voltage between the start and the end of the integration period, controlling an intermediate transfer of charge from the photodiode to the memory node; and
  - a final voltage pulse at the end of the integration period, controlling a final transfer of charge from the photodiode to the memory node;
- applying, to the gate of all of the second transfer transistors, a second voltage pulse after each first voltage pulse and before the final voltage pulse, the second voltage pulse setting a potential barrier height under the gate of said second transistors in relation to the potential of the memory node, allowing the charge in said memory node beyond a maximum amount of charge that can be held in said memory node to be clipped.

Preferably, the method comprises the application of N first and second pulses per integration period, N being an integer at least equal to 1, and the N first voltage pulses applied during an integration period divide said integration period into N+1 successive integration durations of increasingly shorter length, and the N second associated voltage pulses define N clipping thresholds in the memory node which keep increasing over the integration period.

N is advantageously chosen to be equal to 2. Otherwise, N is set according to a measurement of the ambient light, preferably at a value chosen from between 1 and 2.

In one variant, the time of application of each first pulse and/or the clipping threshold associated with each second pulse are determined according to a measurement of the ambient light.

In the phase of reading out each of the pixels of one row, the method advantageously applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

The invention also relates to an image sensor comprising at least one row of active pixels, with a pixel structure comprising a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, and the sequencing circuit is configured to implement such a control method.

BRIEF DESCRIPTION OF THE DRAWINGS

Other features and advantages of the invention are presented in the following description, given with reference to the appended drawings in which:

FIG. 2 is a timing diagram of the control signals for controlling a pixel in an image capture cycle, in a first exemplary implementation of the invention carrying out one (1) transfer/clipping operation per cycle;

FIGS. 3a to 3h show, for each of phases 1 to 8 of the integration period of the cycle, the diagrams of the corresponding potentials in the structure of the pixel; and FIG. 4, the corresponding response curve of a pixel, showing the amount of charge at the readout node as a function of the luminous flux;

FIGS. 5a to 5c show, for each of phases 9 to 11 of the CDS readout sequence of a pixel, the diagrams of the corresponding potentials in the structure of the pixel;

DETAILED DESCRIPTION

The invention pertains to an image capture method by an active pixel image sensor, with a pixel structure that comprises a memory node between the photodiode and the readout node. It is also necessary to provide a detailed description of such a structure, in order to facilitate the subsequent description of the method of the invention.

Structure of the Pixels

Active pixels are produced using CMOS technology in a doped (for example p-doped) active semiconductor layer and in addition comprise photodiodes, which are in principle what are referred to as pinned photodiodes, capacitive storage nodes and transistors. Embodiments thereof employ various CMOS technologies well known to those skilled in the art. The context is that of a substrate with a p-doped active semiconductor layer, which substrate is biased to a zero reference potential and the circuits of which are supplied with a positive supply voltage denoted by Vdd. The various transistors of the pixels are NMOS transistors, with source and drain regions that are n-type diffusions on either side of a p-type channel under the gate. Those skilled in the art will be capable of carrying out the necessary adaptations in the context of a substrate with an n-doped active semiconductor layer.

Figure 1:
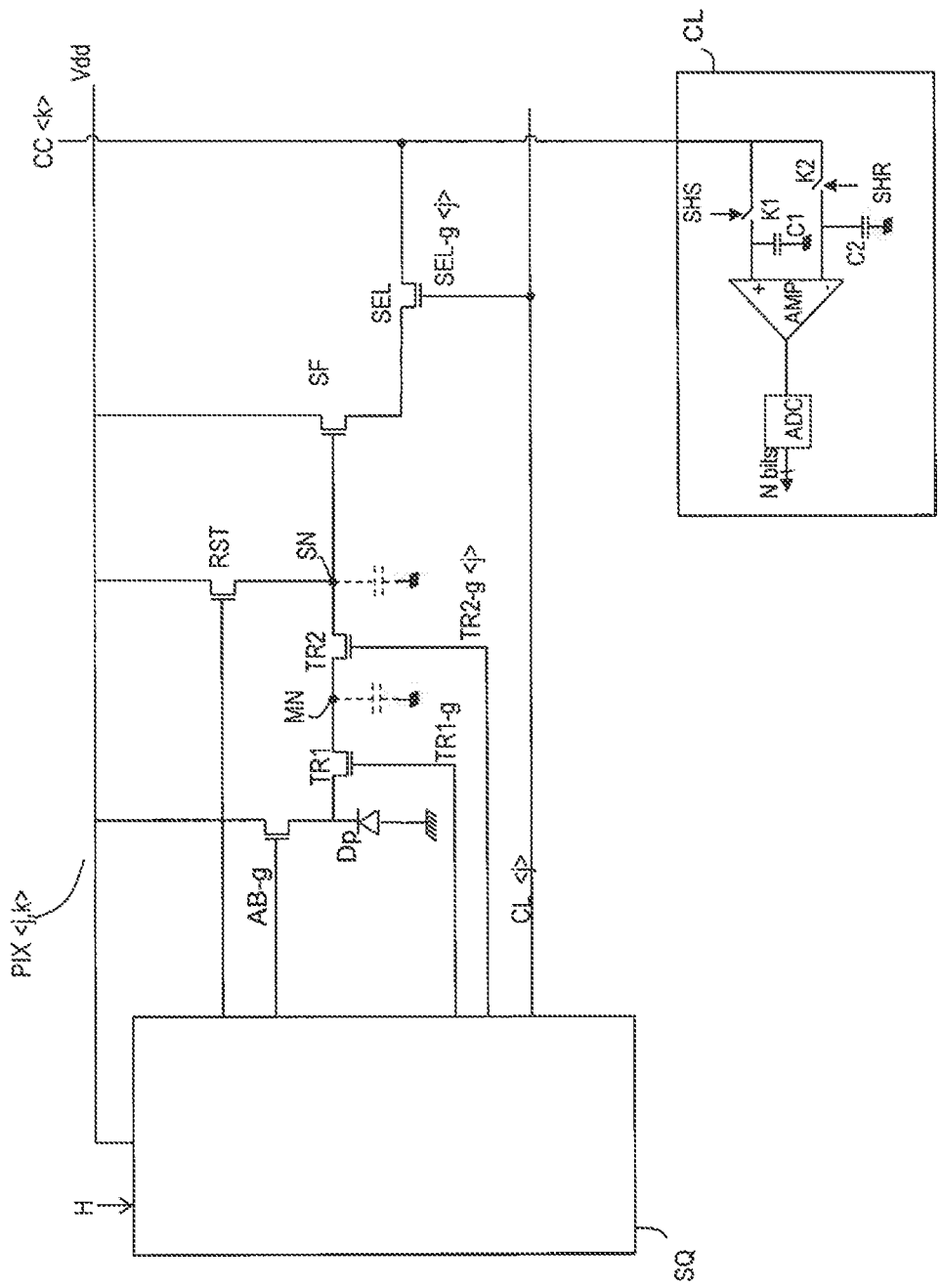
FIG. 1 illustrates a general structure of an active pixel to which the invention may be applied.

FIG. 1 is a circuit diagram of an exemplary structure of an active pixel with a memory node between a photosensitive element and a readout node: the pixel PIX comprises a photodiode Dp, a memory node MN which is a capacitive storage node, a readout node SN which is also a capacitive storage node, and a first transfer transistor TR1 between the photodiode Dp and the memory node MN and a second transfer transistor TR2 between the memory node MN and the readout node SN.

The pixel also comprises, in a conventional manner, a reset transistor RST for resetting the readout node SN, the source of which is electrically connected to the readout node and the drain of which is connected to the positive supply voltage Vdd; a follower transistor SF, the gate of which is electrically connected to the readout node SN, and the drain of which is biased to the supply voltage Vdd. In the example, the pixel comprises a selection transistor SEL, the gate of which is connected to a row conductor CL allowing the row of the pixel to be selected, the drain of which is electrically connected to the source of the follower transistor and the source of which is connected to a column conductor CC of the matrix array (the pixels being arranged in the form of a matrix, in n rows of rank j equal to 1 to n, and m columns of rank k equal to 1 to m), each column conductor CC being connected, at the foot of the column, to a readout circuit CR common to all of the pixels of the column.

In the example, a sixth transistor AB is also provided, which allows the photodiode to be initialized, by removing charge via its drain. When it is not provided, the photodiodes are initialized by activating (i.e. turning on), together in each pixel, the transistors TR1, TR2 and RST.

In practice, these transistors are not all necessarily constructed in a conventional manner, independently of the other elements of the pixel, with a source region, a drain region, a channel region separating the source from the drain and an insulated gate above the channel, as shown in FIG. 1. Certain transistors are, in reality, essentially composed of an insulated gate to which a control potential may be applied. Thus, for example, the first transfer transistor TR1 may be composed of a simple transfer gate TR1-g, insulated from the substrate, surmounting a p-type channel region which is located between the n-type region of the photodiode Dp (source of TR1) and the n-type region of the memory node MN (drain of TR1). Likewise: the second transfer transistor TR2 may be composed of a simple transfer gate TR2-g, insulated from the substrate, surmounting a p-type channel region which is located between the n-type region of the memory node MN (source of TR2) and the n-type region of the readout node SN (drain of TR2). Additionally, the source of the initialization transistor AB may be the n-type region of the photodiode which accumulates the charge generated by the light; and the source of the RST transistor may be the n-type region of the readout node. Throughout the rest of the description, the term "gate" may be used to refer to these transistors.

Lastly, at least some of these transistors may be common to multiple pixels. In particular, the selection transistor SEL, the follower transistor SF and/or the initialization transistor AB of the photodiodes may be common to a plurality or all of the pixels. Additionally, the initialization transistor AB may be omitted, as stated above. Lastly, the selection transistor may also not be present, the selection function then being provided by the reset transistor, via a drain bias voltage command capable of turning the follower transistor off outside of readout phases. In this case, the source of the follower transistor is directly connected to the column conductor. All of these structural variants of active pixels are known to those skilled in the art. The invention that will be described in relation to the structure of FIG. 1 is also applicable to these various variants.

The photodiode Dp of the pixels is typically a pinned photodiode pinned to a voltage denoted by Vpin defined by the technology, i.e. it comprises, on the n-type diffusion region, a superficial p-type diffusion region and the superficial region is brought to the reference potential (zero) of the substrate. For a given technology, the storage capacity of the photodiode is defined by its area.

The readout node SN is generally composed of a floating n-doped semiconductor region. The charge storage capacity of this readout node is determined by its dopant concentration and its geometry.

The memory node must be produced in a manner different from the floating diffusion of the readout node, since it must be possible to set its potential so as to allow it to be used as an intermediate storage node for storing the charge of the photodiode at the end of the integration period, for the time to allow the prior sampling in each pixel, in the readout phase, of the reference potential level of the readout node. However, its storage capacity must be equivalent to that of the readout node. Those skilled in the art have access to various readout node technologies for this purpose. In one example, the readout node is produced by a semiconductor region surmounted by a gate, and this gate is biased to a potential which allows the semiconductor region of the memory node to be set up under the gate at a determined potential level that is intermediate between the Vpin level of the photodiode and Vdd: it is thus possible to transfer the charge from the photodiode to the memory node at the end of the integration period; and, subsequently, to transfer the charge contained in the memory node to the readout node, in the readout phase. The applied potential may vary according to the phase in question, but, in order to simplify the following description, the potential of the memory node MN will hereinafter be considered to be a determined fixed value $V_{MN}$. The charge storage capacity of the memory node depends, in this example, on the gate capacity (hence on its geometry), on the dopant concentration, etc.

Other memory node structures could be used, such as those described, for example, in the patent publications WO2006130443, U.S. Pat. No. 598,629, or FR2961631.

Control Method

A pixel structure such as that which has been described is specially adapted to an image capture method in which an image capture cycle comprises one integration period common to all of the pixels, followed by a row-by-row readout of the pixels, i.e. a correlated double sampling readout (CDS readout). It is specified that the pixels are usually arranged in a matrix of rows and columns of pixels.

Integration

According to the invention, it is proposed to carry out, in the common integration period of duration Ti, at least one transfer of charge from the photodiode to the memory node, at an intermediate voltage between the start and the end of the integration period, and to clip, subsequent to each of these intermediate transfers, the amount of charge contained in the memory node, in relation to a determined threshold. The photodiode starts to accumulate charge again following the first transfer. At the end of the integration period, this new charge is transferred to the memory node, and it is added to that already contained in the memory node following the one or more transfers and clipping operations carried out in the integration period. The transfer of charge to the memory node at an intermediate voltage is controlled through the application of a first voltage pulse to the first transfer gate. The clipping of the charge contained in the memory node is achieved through the application, after this first pulse, of a second voltage pulse to the second transfer gate, and the voltage of this pulse is at a determined level which sets the clipping threshold, i.e. the maximum amount of charge that can be held in the memory node, by setting the height of the potential barrier of the semiconductor region under the gate of the second transfer transistors in relation to the potential of the memory node.

This will now be described in detail, using the timing diagram of FIG. 2 and the diagrams of FIG. 3. These diagrams show the potentials in the pixel structure of FIG. 1 for the various phases ① to ⑤ of the integration period in one exemplary implementation of the invention in which, in the integration period and simultaneously in all of the pixels, N=1 transfer followed by one (1) operation of clipping the charge contained in the memory node are carried out.

In these FIG. 3, the various transistor gates are represented by a rectangle, the background colour of which indicates the value of the applied gate potential: white=zero; black=Vdd; grey=an intermediate potential between zero and Vdd.

An initial state (not shown) is started from, in which the transfer transistors are in the off state. During the integration period, the initialization transistor of the readout node will generally be on (gate at Vdd), connecting the readout node SN to the supply voltage Vdd.

The integration cycle starts with a phase ① of initializing all of the photodiodes. In the example, a voltage pulse Pi is applied to the initialization gate AB-g of the photodiodes (FIGS. 2 and 3a) which turns the initialization transistors AB fully on so as to empty the photodiodes of all charge, via their drains $D_{AB}$. The end of the initialization pulse Pi turns these transistors AB off again and sets the voltage $t_0$ of the start of the integration period common to the pixels of a new image capture cycle (FIG. 3b).

According to the invention, in the period of integrating charge by the photodiode, at least one sequence of a phase ② of transferring the charge from the photodiode to the memory node MN, at an intermediate voltage, is envisaged, followed by a phase ③ of clipping the charge contained in the memory node MN, before a final phase ④ of transferring the charge to the memory node.

This sequence proceeds as follows:

intermediate transfer phase ② (FIGS. 3c and 3d): at a time $t_1$, after the start (time $t_0$) of the integration period, a first voltage pulse $P1_a$ is applied simultaneously to the first transfer gate TR1-g of all of the pixels, and the voltage pulse lowers the potential barrier of the semiconductor region under the gate TR1-g enough to allow the charge to be transferred from the photodiode to the memory node. In practice, the voltage pulse $P1_a$ will be between Vpin and Vdd and will be determined by the technology. All of the charge which is accumulated in the photodiode from time $t_0$ and which the photodiode continues to generate is transferred to the memory node MN (FIG. 3c). At the end of this pulse (at time $t_2$), the photodiode is once more isolated from the memory node and once more starts to accumulate (retain) the light-generated charge (FIG. 3d)

clipping phase ③ (FIGS. 3e and 3f): after the end of the first pulse, a second voltage pulse $P2_a$ is applied to the second transfer gate TR2-g of all of the pixels, at time $t_3$. The voltage of this pulse is an intermediate voltage $V_a$ which sets up a height $h_a$ of the potential barrier under the second gate in relation to the potential $V_{MN}$ of the memory node: this barrier height sets a maximum amount of charge Q0 that can be held in the memory node (represented by the pattern of oblique dashes in FIG. 3e): the excess charge is removed in the direction of the power supply source Vdd, via the readout node SN and the reset transistor, which, at least for this time of the integration period, is turned on. In practice, $V_a$ is a voltage that is preferably between 0 and $V_{MN}$, defined depending on the technology so as to obtain the desired threshold Q0 (beyond $V_{MN}$, there will be no significant clipping effect). At the end of the second pulse $P2_a$, the memory node is once more completely isolated from the readout node SN and from the photodiode (FIG. 3f).

It should be noted that the readout node and the reset transistor RST of the readout node provide a natural route for the removal of excess charge from the memory node. However, other modes of implementation may envisage a specific removal structure, with a dedicated transistor, which would be turned on in the active clipping phases ③.

After this sequence of transfer and clipping phases in the integration period, there follows the final transfer phase ④, marking the end of the integration period (FIGS. 3g and 3h). In this phase ④, a voltage pulse Pf is applied, at time $t_f$, to the gates of the first transfer transistors, and the end (falling edge) of this final pulse marks the end of the integration period for all of the pixels, at time $t_0$+Ti. This pulse allows the charge accumulated by the photodiode since the end of the first transfer pulse to be transferred to the memory node MN: this charge is added to that held in the memory node following the transfer and clipping phases ② and ③ (FIG. 3g) in order to make up the amount of charge representative of the signal level captured by the pixel. It is this level which will subsequently be read out in the readout phase, which is carried out in a conventional manner, preferably with correlated double sampling.

The transfer phase ② at time $t_1$ in the integration period results in the integration period $T_i$ being divided into two successive integration durations $Ti_a$ and $Ti_b$; and the following clipping phase ③, carried out at the end of the first integration duration $Ti_a$, then allows the dynamic range of the pixel to be extended, i.e. the capacity of the pixel to avoid saturation in the event of high levels of illumination without changing its sensitivity to low levels of illumination.

This is shown by the corresponding response curve of FIG. 4, which represents the amount of charge obtained at the end of one integration period, which is therefore the final amount of charge in the memory node, as a function of luminous flux F.

Specifically, there are two possibilities:
- either the luminous flux F received by the photodiode in the first integration period is quite low, resulting in an amount of light-generated charge $Q_a$ (FIG. 2) that is smaller than or equal to the amount of charge Q0;
- or the luminous flux F is higher, above a threshold F0, which produces, after time $Ti_a$, the amount of charge Q0.

In the first case, the amount of charge $Q_a$ transferred to the memory node in phase ② remains in the memory node at the end of the clipping phase ③, since it is trapped by the potential barrier set up under the second gate TR2-g; this amount $Q_a$ is proportional to F and $Ti_a$. The accumulation of charge, which is resumed at the end of the first transfer and continues for the duration $Ti_b$, generates a charge $Q_b$ proportional to F and $Ti_b$. In the final transfer phase ④, charge accumulated in the photodiode in the second integration duration $Ti_b$ is transferred to the memory node MN and it is added to the previous charge: at the end of the duration $Ti_b$, the memory node contains the amount of charge $Q_a+Q_b$, which is proportional to the intensity F of the luminous flux and to the total integration duration $Ti=Ti_a+Ti_b$; and it is this amount of charge $Q_a+Q_b$ that will be read out in the following pixel readout sequence.

Thus, when the luminous flux is below the threshold F0, the amount of charge stored in the pixel, which forms the output signal of the pixel, is proportional to the intensity F and to the total integration duration $Ti=Ti_a+Ti_b$. The response curve of the total charge $Q=Q_a+Q_b$ as a function of F, shown in FIG. 4, has a first, linear section (for E<E0) with a slope that is determined by the total duration $Ti=Ti_a+Ti_b$.

In the second case, the amount of charge $Q_a$ photogenerated by the photodiode in the first integration duration $Ti_a$ is above the threshold Q0: then the surplus charge is emptied in the clipping phase ③; only the threshold value Q0 remains in the memory node at the end of this phase. In the second integration duration $Ti_b$, the photodiode accumulates an amount $Q_b$ of new photogenerated charge which is proportional to the intensity of the flux F and duration $Ti_b$. The result of this, at the end of the second integration duration $Ti_b$ and as the outcome of the final transfer phase ④, is that the memory node MN comprises an amount of charge which is the sum of $Q0+Q_b$. Stated otherwise, the final amount of charge is proportional to $F0 \cdot Ti_a + F \cdot Ti_b$, which may also be written as $F0 \cdot (Ti_a+Ti_b)+(F-F0) \cdot Ti_b$, in which F is the received luminous flux that is above F0, and F0 is the luminous flux up to the charge threshold Q0.

The response curve beyond F0 is therefore a straight line, the slope of which is gentler, in terms of the ratio $Ti_b/(Ti_a+Ti_b)$, than the slope of the straight line below F0.

Overall, the curve of the total amount of charge as a function of the illumination is a broken straight line with two successive slopes, the first slope being steeper, allowing the sensor to retain good sensitivity to low levels of luminous flux, and the second, gentler slope allowing the dynamic range of the sensor to be extended to high levels of flux: if it is assumed that the photodiode is saturated for an amount of charge Qs, it may be seen that this quantity of charge is reached for a level of luminous flux Fs1 that is higher than it would have been if the curve comprised only the first slope (in which case it is saturated for the flux Fs0 referenced in FIG. 4). The dynamic range, i.e. the capacity of the pixel to avoid saturation in the event of high levels of illumination (second portion of the curve), has therefore been increased, from Fs0 to Fs1, without decreasing sensitivity to low levels of illumination (first portion of the curve).

The response curve at extended dynamic range may thus be regulated by the values $V_a$ and $Ti_b$, for an integration period of determined duration $T_i$ (this value $T_i$ determining the slope of the first straight line): the choice of the potential $V_a$ applied to the second transfer gate TR2-g in phase ③ determines the point at which the slope changes at a chosen value for Q0; and the second integration duration $Ti_b$, preferably shorter than the first duration $Ti_a$, determines the slope of the second straight line. It is typically possible to choose a second integration duration $Ti_b$ that is equal to 5 to 10% of $Ti_a$.

Figure 6:
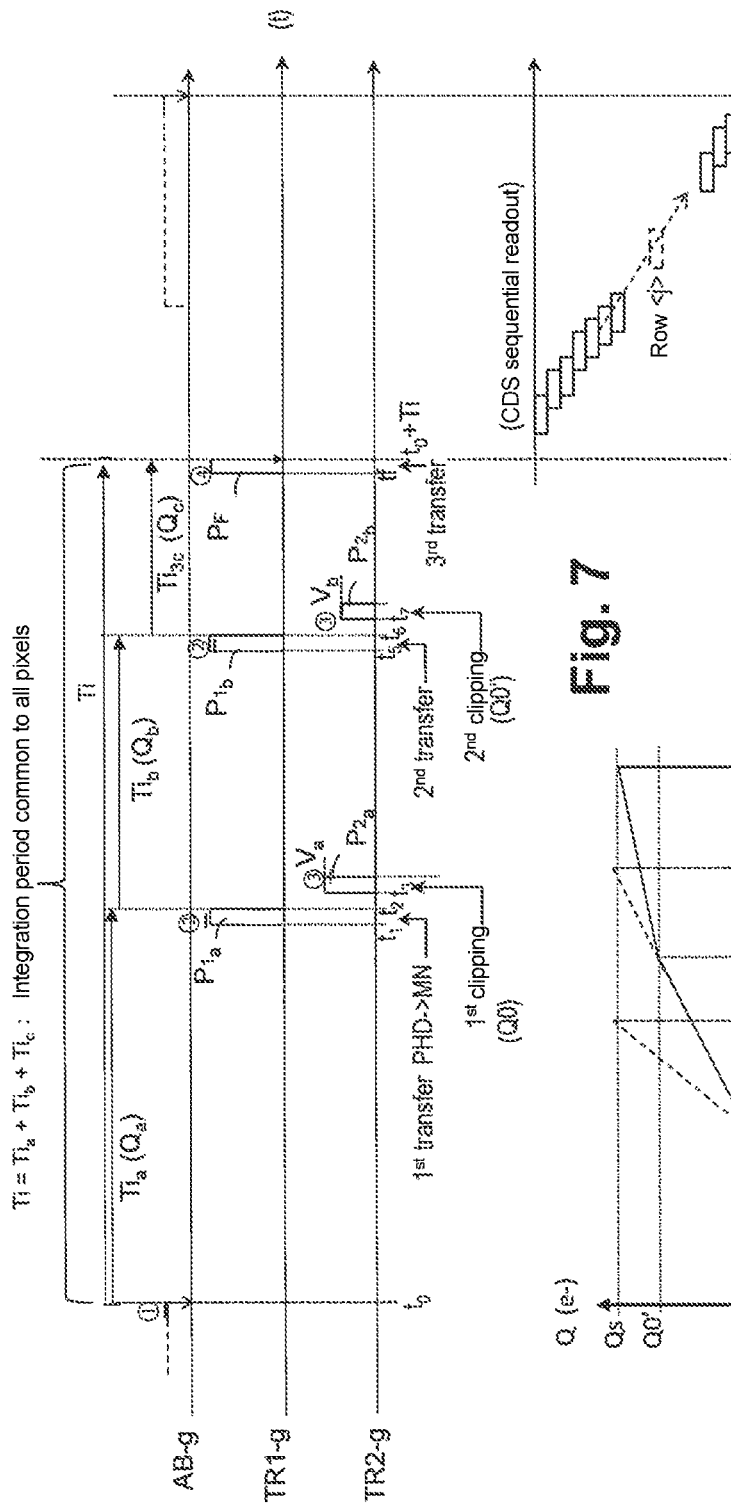
FIGS. 6 and 7 show the signal timing diagram and the corresponding response curve for the pixel, for another exemplary implementation carrying out two transfer/clipping operations per image capture cycle.
Figure 7:
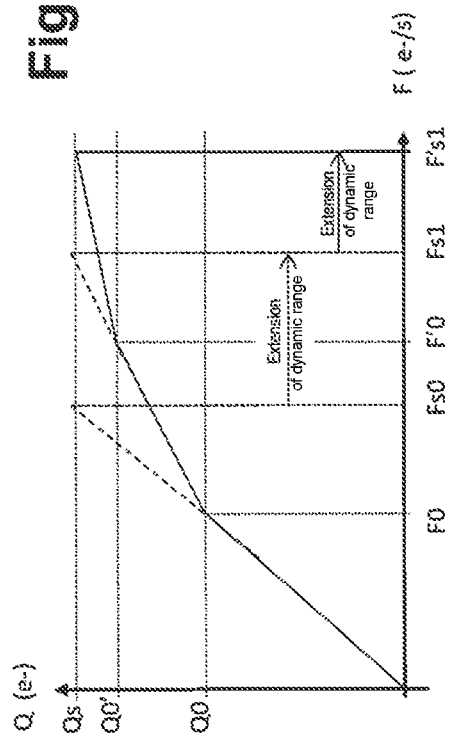

It is possible to generalize to N intermediate transfer/clipping operation(s). For example, FIG. 7 illustrates the change in the response curve that would occur if a second transfer/clipping operation to Q'0 were carried out after the first transfer/clipping operation to Q0, and before the final transfer, according to the timing diagram of FIG. 6. Namely then, in the total duration Ti of the integration period, the sequence of the transfer and clipping phases ② and ③ is repeated N=2 times before the end of the integration period. However, less will be clipped the second time in comparison with the first time, in order to retain a charge Q'0, higher than the charge Q0 defined by the first clipping, in the memory node: the second pulse $P2_b$ applied to the second transfer gates TR2-g thus has a voltage level $V_b$ that is lower than the level $V_a$ applied the first time; this level $V_b$ defines a potential barrier height under these second gates that is higher than the height $h_a$ of the first sequence. The charge Q'0 thus defined by the voltage $V_b$ corresponds to a second illumination threshold F'0. The integration period Ti is then broken down into three successive integration durations $Ti_a$, $Ti_b$ and $Ti_c$, which are preferably of increasingly shorter length. Additionally, the response curve comprises not one but two break points, corresponding to the points (Q0, F0) and (Q'0, F'0).

Beyond the level of illumination F'0, and below a value Fs'1 that would saturate the pixel, the total amount of charge present in the memory node MN after the second clipping operation is proportional to $F0 \cdot (Ti_a+Ti_b+Ti_c)+(F'0-F0) \cdot (Ti_b+Ti_c)+(F-F'0) \cdot Ti_c$. The first slope is defined by the total integration duration Ti; the second slope is defined by the duration $Ti_b+Ti_c$; the third slope is defined by the duration $Ti_c$. It may be seen from the curve of FIG. 6 that the saturation illumination value F's1 may be higher than the preceding value Fs1, while retaining higher sensitivity in the portion between F0 and F'0 only if a single direct slope between the point (F0, Q0) and the saturation point (F's1, Qs) had been chosen.

In theory, it is possible to generalize the control method to N transfer/clipping operations before the final transfer. However, in practice, the choice of N=2 transfer/clipping operations is advantageous, with optimized sensitivity over the entire range. Beyond N=2, there are substantial technological constraints on the clipping thresholds that may be set.

Provision may also be made for the value of N to be set according to a measurement of the ambient light, preferably between the values 1 and 2. For example, it is possible to make provision for N to be chosen to be equal to 1 in a context of average ambient light and to be equal to 2 if more extreme levels of ambient light may be measured.

Readout

Once the integration period has ended, the phase of reading out the pixels may start. The readout is performed sequentially, row by row, in the usual manner of the prior art.

Preferably, the readout is of correlated double sampling type. It is performed in the following manner, as illustrated by FIGS. 2 and 5:

- each row of pixels of rank j (j=1 to n) is selected one at a time, by a respective selection control pulse SEL<j> which, in the example, is applied to the gate SEL-g of the selection transistor SEL. The effect of this selection for each pixel of the row is to electrically connect the source of the follower transistor SF to the associated column conductor CC<k>, and therefore to the readout circuit CR at the foot of the column (FIG. 1). The CDS readout of the pixels is carried out during this selection time, while isolating the readout node from the supply voltage Vdd (the potential of the gate RST-g of the pixels of the selected row is brought to 0), and comprises the series of following phases ⑤ to ⑦:
- phase ⑤: the reference potential of the readout node SN is sampled in the readout circuit at the foot of the column. This sampling is represented in FIGS. 2 and 5a by the command SHR.
- phase ⑥: the second transfer transistor $TRA_2$ of the pixels of the selected row is turned fully on by a voltage pulse of level Vdd, applied to their gate $TRA_2$-g, allowing all of the charge held in the memory node MN to be transferred to the readout node SN (SHS, FIGS. 2, 5b and 5c).
- phase ⑦: At the end of this transfer pulse, the potential of the column conductor CC<k> is set at a signal level representative of the amount of charge in the readout node and this signal level is sampled in the readout circuit at the foot of the column.

This readout sequence is applied simultaneously to all of the pixels of the selected row, then repeated for each of the rows of pixels of the sensor, successively, until the last row.

A new integration period of a new integration cycle and subsequent readout may start with a new photodiode reset phase ①. In practice, the new cycle may start as soon as the last final transfer defined by phase ④ has ended.

The various control signals of the various sequences are delivered, in the conventional manner, by a sequencing circuit SQ for sequencing the pixels of the matrix (FIG. 1) on the basis of supply and clock signals of the sensor.

The invention that has been described is particularly advantageous for miniaturized sensors if it is additionally envisaged to implement it with memory node technologies offering a capacity per unit area that is intrinsically higher than that permitted by pinned photodiode technologies.

The invention claimed is:

1. An image capture method in an active pixel image sensor, applying an integration period common to all of the pixels before a phase of reading out the pixels, row by row, each pixel comprising a memory node between a photosensitive element and a readout node of the pixel, with a first charge transfer transistor placed between the photosensitive element and the memory node and a second charge transfer transistor placed between the memory node and the readout node, wherein in each new integration period, the method comprises the following control steps, across all of the pixels simultaneously:

applying, to the gate of all of the first transfer transistors:
    - at least one first voltage pulse at an intermediate voltage between the start and the end of the integration period, controlling a transfer of charge from the photodiode to the memory node; and
    - a final voltage pulse at the end of the integration period, controlling a final transfer of charge from the photodiode to the memory node, the end of the pulse marking the end of the current integration period;

applying, to the gate of all of the second transfer transistors, a second voltage pulse after each first voltage pulse and before the final voltage pulse, the second voltage pulse setting a potential barrier height under the gate of said second transistors in relation to the potential of the memory node, allowing the charge in said memory node beyond a maximum amount of charge that can be held in said memory node to be clipped.

2. The method of claim 1, further comprising the application of N first and second pulses per integration period, N being an integer at least equal to 1, and the N first voltage pulses applied during an integration period divide said integration period into N+1 successive integration durations of increasingly smaller length, and the N second associated voltage pulses define N clipping thresholds in the memory node which keep increasing over the integration period.

3. The method of claim 2, in which N=2.

4. The method of claim 2, in which N is set according to a measurement of the ambient light, preferably at a value chosen between 1 and 2.

5. The method according to claim 1, in which the time of application of each first pulse and/or the clipping threshold associated with each second pulse are determined according to a measurement of the ambient light.

6. The method according to claim 1, in which the phase of reading out each of the pixels of one row applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

7. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 1.

8. The method according to claim 2, in which the time of application of each first pulse and/or the clipping threshold associated with each second pulse are determined according to a measurement of the ambient light.

9. The method according to claim 3, in which the time of application of each first pulse and/or the clipping threshold associated with each second pulse are determined according to a measurement of the ambient light.

10. The method according to claim 4, in which the time of application of each first pulse and/or the clipping threshold associated with each second pulse are determined according to a measurement of the ambient light.

11. The method according to claim 2, in which the phase of reading out each of the pixels of one row applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

12. The method according to claim 3, in which the phase of reading out each of the pixels of one row applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

13. The method according to claim 4, in which the phase of reading out each of the pixels of one row applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

14. The method according to claim 5, in which the phase of reading out each of the pixels of one row applies a correlated double sampling for each pixel, with a first sampling of a reference level, corresponding to an initialization of the readout node, then a second sampling of a signal level corresponding to the charge which is contained in the memory node at the end of the integration period and which has been transferred to said readout node for readout.

15. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 2.

16. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 3.

17. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 4.

18. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 5.

19. An active pixel image sensor comprising at least one row of active pixels, in which each active pixel comprises a memory node between a photosensitive element and a readout node of the pixel, with a first charge transfer transistor placed between the photosensitive element and the memory node and a second charge transfer transistor placed between the memory node and the readout node, and a sequencing circuit for sequencing the signals required for image capture comprising an integration period common to all of the pixels, and a phase of successively reading out the pixels of each row, wherein the sequencing circuit is configured to implement a control method according to claim 6.

* * * * *